United States Patent
Odone et al.

[15] 3,652,160
[45] Mar. 28, 1972

[54] LIGHT BEAM RANGEFINDER

[72] Inventors: Giovanni Odone, La Rosiaz, Lausanne; Heinrich Kunz, Yverdon; Willy Buch, Valeyres, sur Montagny, all of Switzerland

[73] Assignee: Paillard S. A., Sainte-Croix(Vaud), Switzerland

[22] Filed: Sept. 15, 1969

[21] Appl. No.: 858,004

[30] Foreign Application Priority Data

Sept. 26, 1968 Switzerland ..........................14403/68

[52] U.S. Cl. ....................................356/4, 95/44.6
[51] Int. Cl. ................................................G01c 3/08
[58] Field of Search........................356/4, 5; 95/44 C

[56] References Cited

UNITED STATES PATENTS 2,996,946  8/1961  Brenholdt..................................356/5
3,054,898  9/1962  Westover et al............................356/4
3,218,909  11/1965  Fain............................................356/4

FOREIGN PATENTS OR APPLICATIONS 1,088,254  10/1967  Great Britain..............................356/4
  449,985   4/1968  Switzerland................................356/4

Primary Examiner—Richard A. Farley
Assistant Examiner—S. C. Buczinski
Attorney—Emory L. Groff and Emory L. Groff, Jr.

[57] ABSTRACT

A rangefinder comprises a projector furnishing a modulated light beam directed on to the object to be ranged and a receiver to pick up the reflected rays. The rangefinder is designed to avoid disturbances of the readings by chance interference signals. The receiver has a photoelectric cell at the front and rear of a mirror on to which some of the reflected rays are converged by a lens. The photocells are mounted for axial displacement so as to adjust for equal light reception according to the convergence and hence the range of the rays reflected from the object. The signals from the photocells are cut off and connected by a device actuated in rhythm to conform to a constant phase relationship with the light beam modulation. The cut off device connects the receiver to a storage device for the measured signals in which the stored sums of the interfering signals give a substantially nil value. The storage device is an RC element whose time constant is several times that of the beam modulation. The circuit includes a differential amplifier. Output signals from "gate" circuits control the axial displacements of the photocells by supplying a motor driving a threaded shaft bearing a tapped nut supporting the photocells. A camera incorporating the rangefinder has an objective adjustment ring coupled to respond to rotation of the shaft.

6 Claims, 5 Drawing Figures

3,652,160

INVENTORS
GIOVANNI ODONE
HEINRICH KUNZ
WILLY BUCH
BY Emory L. Groff Jr
ATTORNEY

LIGHT BEAM RANGEFINDER

The present invention relates to a light beam rangefinder and more especially to a rangefinder comprising a projection furnishing a modulated light beam directed on to the object whose distance is to be determined, a receiver intended to pick up the rays reflected by said object, these rays being exposed to disturbances arriving from interference signals due to chance, this receiver comprising at least one photoelectric element furnishing an electric signal in response to reflected light rays.

It is an object of the invention to render negligible the influence of interfering rays, in order to prevent the latter from falsifying the results of the measurements. This object is achieved according to the invention due to the fact that the rangefinder comprises a device for the cutoff and connection of the signal furnished by the receiver, this device being actuated in rhythm with the modulation of the light beam by having a constant phase relationship with respect to this modulation, this cutoff device connecting the receiver to a storage device for the measured signals, in which the stored additions of the interfering signal give an appreciably nil value.

In order that the invention may be more fully understood an embodiment of the invention is described below purely by way of illustrative but non-limiting example, with reference to the accompanying schematic drawing in which.

Figure 1:
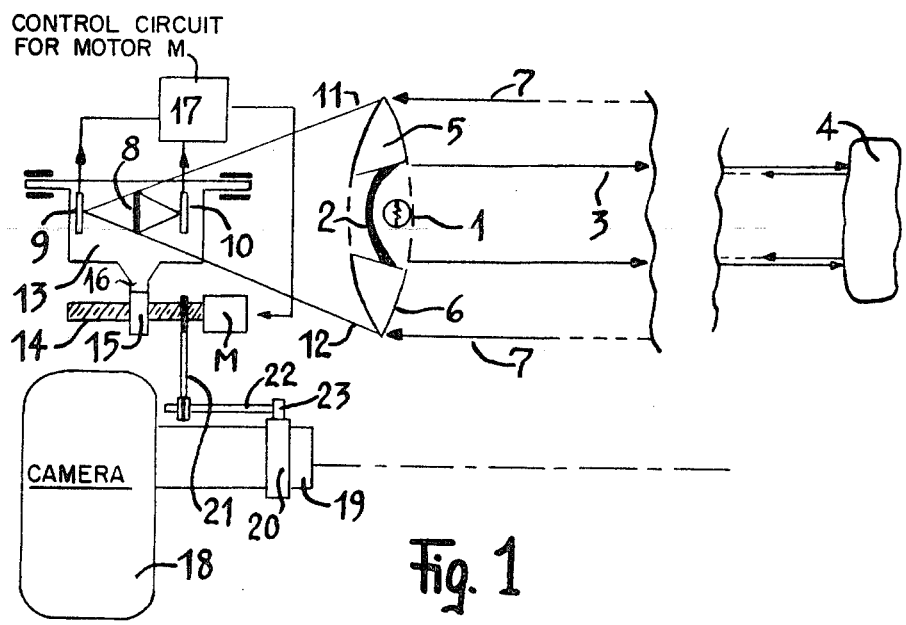
FIG. 1 shows very diagrammatically the general arrangement of one embodiment of a light beam rangefinder according to the invention.

The rangefinder shown in FIG. 1 corresponds to the general principle indicated in the U.S. Pat. application Ser. No. 686,554 filed Nov. 29, 1967 and which is now U.S. Pat. No. 3,558,894, granted Jan. 26, 1971. This rangefinder comprises a projector having an infrared ray lamp 1, placed at the focus of the reflector 2, so as to obtain a beam 3 with substantially parallel rays. This beam is directed on to an object 4 whose distance it is desired to determine. The luminous "spot," formed on the object 4, reflects rays in the direction of a convergent receiver system, constituted by two portions 5 and 6 of a bi-convex lens. These portions 5 and 6 are arranged on both sides of the reflector 2. The rays 7, received by this converging system, converge behind the projector 2 at a distance which varies as a function of the distance between the rangefinder and the object 4.

The two convergent beams formed by the portions 5 and 6 are directed towards the edges of a mirror 8, so that the rays passing above this edge strike a photoelectric element 9, whilst the rays reaching the mirror 8 are reflected by the latter towards a photoelectric element 10. Over a certain distance of convergence of the rays picked up by the portions 5 and 6, it is possible to balance the light fluxes striking the photoelectric elements 9 and 10.

If the object 4 recedes from the rangefinder, the distance of convergence of the rays formed by the receiver system becomes smaller, and a greater part of the light beams designated by 11 and 12 come to strike the mirror 8 to be reflected towards the photoelectric element 10. The quantity of light received by this element 10 increases at the expense of that received by the element 9.

If, on the other hand, the object 4 approaches the receiver system, the distance of convergence of the rays detected increases and the photoelectric element 9 receives additional light, whilst the light flux striking the element 10 diminishes.

By displacement of the elements 9 and 10 and of the mirror 8, it is possible to measure the distance of convergence of the rays received and through this to determine the distance of the object on which the rangefinder is directed. To this end, the mirror 8 and the elements 9 and 10 are mounted on a support 13 which can be displaced by an electric motor M driving a threaded rod 14 engaged in a nut 15 connected by a foot 16 to the support 13. To this purpose, the motor M is supplied by a control circuit 17 which is itself controlled by the photoelectric elements 9 and 10. The rangefinder is coupled to a camera 18 illustrated diagrammatically and of which the objective 19 has a distance regulating toothed ring 20. The coupling is illustrated diagrammatically by a notched belt 21 driven by the motor M and transmitting the rotation received to a shaft 22 bearing a gear 23 engaged with corresponding teeth of the ring 20.

Figure 2:
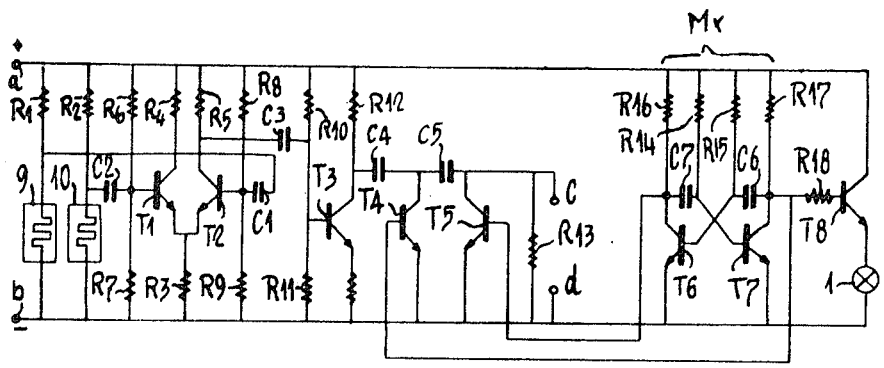
FIG. 2 shows an electrical circuit of the rangefinder of FIG. 1.
Figure 3:
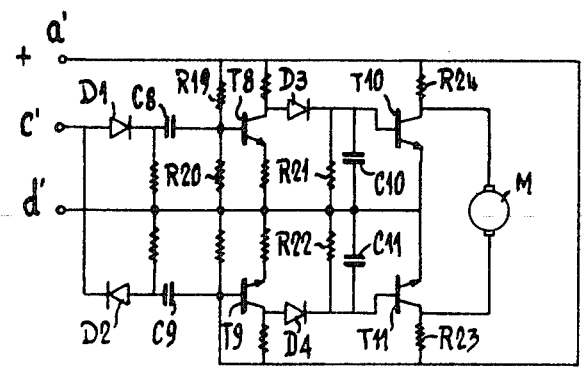
FIG. 3 shows a control circuit for the motor of the rangefinder, this circuit being controlled by a signal furnished by the circuit of FIG. 2.

The control circuit 17 is shown in more detail in FIGS. 2 and 3. There, the photoelectric elements 9 and 10 are shown as being connected in series with a resistance R1 and R2 respectively, between the supply terminals $a$ and $b$ of a direct current source. As the beam furnished by the lamp 1 is modulated at a relatively low frequency, for example comprising to form a Wheatstone bridge between 10 and 100 Hz., the light beams reflected and picked up by the receiver are also modulated, so that the drop voltage at the terminals of the photoconductors 9 and 10 has an alternating component which is in phase with the modulations of the beam. This alternating component of each of the photoconductors 9 and 10 is transmitted by a condenser C1 and C2 respectively, to a differential amplifier with two transistors T1 and T2.

As is well known per se, the two emitters of the transistors T1 and T2 are connected to one terminal of the source of supply by a common resistance R3, whilst the collectors are connected each to the other terminal of this source by an individual resistance R4 and R5 respectively. The bases of the two transistors are biased by voltage dividers comprising two resistances R6 and R7, and R8 and R9 respectively.

When the two photoconductors 9 and 10 are subjected to equal light fluxes, they give rise to identical drops of alternating voltage, of which the difference is nil, so that at the terminals of the resistance R5 of the differential amplifier, no alternating component is found. If one or the other of the photoconductors receives a reflected beam greater than the other, the alternating components transmitted by the condensers C1 and C2 have a difference in amplitude, but of course, are always in phase with the modulation frequency of the beam 3. In this case, an alternating voltage of the same frequency appears at the terminals of the resistance R5, this voltage being in phase, or in counter-phase with the modulation of the light beam according to which of the two photoconductors 9, 10 is the most exposed to the reflected rays.

The alternating current appearing at the terminals of the resistance R5 is transmitted through a condenser C3 to the base of a transistor T3 constituting an amplifier stage. The bias of the base of this transistor T3 is obtained by two resistances R10 and R11. The output voltage taken at the resistance R12 of the collector of the transistor T3 is applied through a condenser C4 to a make-and-break device comprising two transistors T4 and T5 whose collectors are connected to the two terminals of a condenser C5.

The bases of the transistors T4 and T4 are connected to a multivibrator MX and controlled in counterphase so that when the transistor T4 is conductive, the transistor T5 is nonconductive and, when the transistor T5 is conductive, the transistor T4 is non-conductive inversely. When the transistor T4 is conductive, the condenser C5 is connected in parallel with a resistance R13. When the transistor T5 is conductive, the transistor T4 being then nonconductive, the condenser C5 is connected to the output of the amplifier comprising the transistor T3.

The multivibrator MX comprises two transistors T6 and T7, the base of each of these transistors being connected to the collector of the other transistor by a condenser C6, and C7 respectively. The bias of the bases is obtained by the resistances R14 and R15, whilst the resistances of the collectors are designated by R16 and R17. The voltage at the terminals of the resistance R17 controls, through a resistance R18, the base of a transistor T8 which is mounted in series with the lamp 1 between the terminals of the supply source. In this way, the transistor T8 is alternately conductive and nonconductive, so that the lamp 1 is supplied by a current pulsed at the frequency of the multivibrator. The lamp 1 thus supplies a luminous beam modulated in intensity.

The voltage at the terminals of the resistance R13 constitutes a pulsed electrical signal of constant polarity which may be tapped at the terminal c and d, and which indicated either the state of balance, or that of the two photoconductors 9, 10 which receive the greatest modulated flux.

It should be noted that the circuit described is insensitive to interfering rays which can encounter the photoconductors 9 and 10. In fact, if the interfering ray is continuous, it does not give rise to alternating components in the voltage drop at the terminals of the photoconductors, so that its effect is not transmitted to the differential amplifier. If the interfering light flux comprises alternating components and is symmetrically distributed between the photoconductors 9 and 10, the effects that it produces on these photoconductors is subtracted in the differential amplifier and does not therefore appear at the output of the latter. If the interfering light flux is not balanced between the two photoconductors 9, 10, it then gives rise to a voltage at the output of the differential amplifier. However, supposing that this interfering light flux is not furnished by the lamp 1, it is possible that its frequency will be different from the frequency of the modulation frequency of the said lamp. As the transistors T4 and T5 are controlled according to a well determined phase relationship with respect to the modulation of the lamp 1, the condenser C5 constitutes a storage device which is successively connected to the output of the receiver in rhythm with the modulation of the light beam. If the resistance R13 constitutes, with the condenser C5, and element RC of which the time constant is several times greater than the duration of the modulation period of the beam, the charge stored by the condenser C5 is only partially dissipated into the resistance R13 during the duration of closure of the transistor T4. It follows that the potential of the condenser C5 will rise in steps until it reaches the average value for which, at each period of conduction of the transistor T4, its discharge into the resistance R13 is equal to the charge that it receives when the transistor T5 is conductive.

Each charge of the condenser C5 comprises a part which depends on the illumination of the photoconductors 9 and 10 by the reflected modulated light beam and a part which arrives from an alternating interfering light flux. As the first part is always measured for a phase relationship determined with respect to the modulation of the light beam, these successive parts are added. On the other hand, the interfering signals not being synchronized with the modulation of the beam, their accumulated addition gives an average nil value. It thereby results that the successive additions of the output signals enable the detection of the interesting signal among the interfering signals which can have momentary values much greater than the interesting signal.

FIG. 3 shows a circuit enabling the driving of the motor M in one direction or the other according to the relative exposure of the photoconductors 9 and 10 to the reflected beam detected by the receiver. To this end, this circuit uses the electrical signal obtained at the terminals of the resistance R13 of the circuit according to FIG. 2. This signal is applied to the two terminals c' and d' which are connected to the terminals c and d of FIG. 2.

The terminals c' is associated with two diodes D1 and D2 constituting rectifiers enabling the charging of one or other of the condensers C8 and C9 as a function of the polarity and of the amplitude of the pulses received at the terminals of the resistance R13. In fact, by reason of the existence of the differential amplifier in the circuit of FIG. 2, an imbalance between the signals received by the photoconductors 9 and 10 is manifested by positive or negative pulses, according to which of these two photoconductors is the most exposed to the reflected beam. Thus, if the terminal c' is subjected to positive pulses, the condenser C8 will transmit these pulses to the base of a transistor T8 biased by two resistances R19 and R20, the condenser C9 not receiving any change through the diode D2. On the contrary, if the pulses are negative, it is the condenser C9 which transmits these pulses to the base of a transistor T9, whilst the diode D1 blocks any signal in the direction of the transistor T8.

Thus, the positive pulses are amplified by the transistor T8, whilst the negative pulses are so by the transistor T9. The collectors of these two transistors are connected each to a rectifier element D3, R21, C10 or D4, R22, C11, respectively, so that the positive and negative pulses respectively, make a continuous voltage appear at the base of the two transistors T10 and T11 which each controls the supply of the motor M. When the transistor T10 is conductive, the current arising from the positive terminal a' passes through a resistance R23 to traverse the motor M, the transistor T10, and return to the terminal d' which is connected to the negative pole of the supply source. If on the contrary, it is the transistor T11 which is conductive, the current arising from the terminal a' traverses a resistance R24, then the motor M in reverse direction from the preceding case, to return to the terminal d' through the conductive transistor T11.

One can, of course, depart from the scheme described above and achieve the same object by other means. Thus, the storage device constituted by the element RC comprising the condenser C5 and the resistance R13 could be replaced by a condenser connected so as to receive a succession of elemental charges each corresponding to the measurement effected in the course of a period of the modulation of the light flux, this condenser being discharged after it has stored several elemental charges. The average value of the signal detected could then be deduced either from the time of charge necessary to obtain a certain potential at the terminals of the condenser, or from the discharge current of the condenser after certain interval of time. The successive measurements could also be added in a digital electronic adding device.

Figure 4:
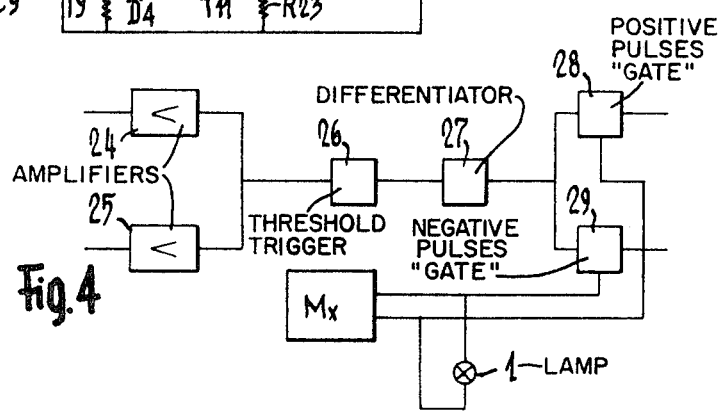
FIG. 4 is a block diagram of a variation of one embodiment.

FIG. 4 illustrates schematically a variation of execution tending to achieve maximum safety and insensitivity of the rangefinder to interferences of short duration, but extremely violent. This embodiment assumes that the rangefinder comprises a circuit according to that of FIG. 2, which gives, between the terminals c and d, a signal corresponding to the curve g of FIG. 5, that is to say a succession of positive pulses having a certain phase relationship with respect to the curve f showing the modulation of the light beam. In addition, the rangefinder must comprise means to form a signal conforming to curve h of FIG. 5, this signal being formed by negative pulses having another phase relationship than the signal g with the modulation f of the light beam.

The means for obtaining the signal h can consist of a simple repetition of the condenser C5, of the resistance R13, of transistors T4 and T5 of FIG. 2, the control voltages of the transistors T4 and T5 being crossed in this case.

Figure 5:
FIG. 5 shows the state of the electric signals at various points of the diagram according to FIG. 4.
Figure 5:
Figure 5:
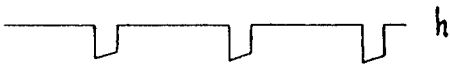
Figure 5:
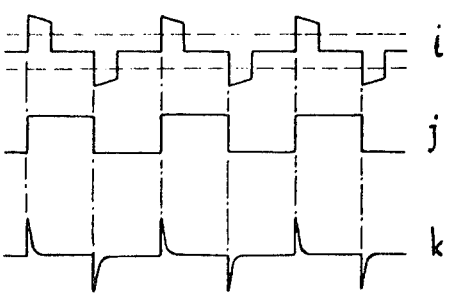

The diagram according to FIG. 4 comprises two amplifiers 24, 25 of which the input signals are represented by the curves g and h of FIG. 5. The outputs of these amplifiers 24 and 25 are coupled, so that the resulting signal at their output is given by the curve i which is the sum of curves g and h. This signal comprises a succession of positive and negative pulses which are applied at the input of an input threshold trigger 26. This trigger can be constituted by a bi-stable balance whose rocking movements in one direction are controlled by a positive pulse exceeding a predetermined threshold value, the rocking in the other direction being produced by a negative input pulse also exceeding a predetermined level. Thus, the application of the signal i of FIG. 5 at the input of the trigger 26 enables an output signal to be obtained from this latter corresponding to the curve i of FIG. 5. This latter signal is applied to a differentiator 27 to be transformed into a signal given by the curve k of FIG. 5, this signal consisting of a series of alternated positive and negative pulses.

The signal *k* is applied to the input of two circuits "gate" 28 and 29 which are controlled by the multivibrator MX, so as to open and closed at the same time. The circuit 28 is intended to allow positive pulses to pass, whilst the circuit 29 can allow to pass the negative pulses. If the positive pulses of the signal *k* arrive at the circuit 28 during the moments of opening of the latter, an output signal from the "gate" circuit 28 is obtained, which signal is used to control the rotation of the motor M (FIG. 1) in a predetermined direction. The rotation of this motor in the direction is controlled by the output signal of the "gate" circuit 29 which is obtained when it is negative pulses that are applied at the input during the opening of circuits 28 and 29.

If a very strong interference comes to modify the signal according to the curve *i* of FIG. 5 so that it causes the complete disappearance of a positive or negative pulse, or even its replacement by a pulse of reverse polarity, the absence of the pulse in question would suppress a rocking movement of the trigger 26. The latter would thus remain in its position until the re-establishment of alternate pulses of the curve *i*. The momentary blockage of the trigger 26 results in the suppression of pulses of the curve *k* and hence of any output signal beyond the "gate" circuits 28 and 29. Thus, the appearance of an abrupt and intense interference signal cannot introduce an error into the control signal of the motor M, but causes the suppression of this signal until the end of the interference. The motor M hence remains in its existing position until the operation conditions are re-established as normal.

It will be understood that various changes and modifications may be made in the embodiments described without departing from the essential concept of the invention as defined in scope by the appended claims.

1. A rangefinder comprising a projector furnishing a modulated light beam directed on to the object whose distance is to be determined, a receiver adapted to pick up the rays of said modulated light beam reflected by the object, said rays being subject to disturbances arising from chance interference signals, said receiver comprising at least one photoelectric element furnishing an electrical signal in response to the reflected light rays, said rangefinder comprising a make-and-break device for cutting off and connecting the signal furnished by the receiver, said device being actuated in rhythm with the modulation of the light beam by having a constant phase relationship with respect to said modulation, said make-and-break device connecting the receiver to a storage device for the measured signals and for the interference signals as well, in which the stored sums of the interference signals give an appreciably nil value.

2. A rangefinder according to claim 1, wherein said storage device is constituted by an RC element whose time constant is several times greater than the duration of a period of the modulation of the beam.

3. A rangefinder according to claim 2, comprising two photoconductors connected respectively to two inputs of a differential amplifier, one output of which is connected to a terminal of a condenser of which the other terminal is connected to a resistance to form said RC element, the two terminals of the condenser being connected to earth by two electronic interruptors controlled so as to be alternately conductive.

4. A rangefinder according to claim 2, comprising at least one differential amplifier of which the two inputs are connected to two photoconductors furnishing two signals of opposite signs, said two photoconductors being displaceable to enable the determination of the point of convergence of the reflected rays picked up by the receiver, said differential amplifier comprising two make-and-break devices actuated in phase opposition with respect to one another, each device acting on one of the said signals so as to furnish pulses of one polarity for one of the signals and of the other polarity for the other signal, said pulses of each polarity being applied to the input of a trigger at an input threshold, the output of said trigger is applied to a differentiator, the pulses of alternate polarities furnished by said differentiator being applied to two "gate" circuits controlled respectively in phase and counterphase with the modulation of the light beam, the output signals of one of said gate circuit and of the other controlling the displacements of the photoconductors in one direction and the other direction respectively.

5. A rangefinder according to claim 4, including displacement means for said photoconductors comprising an electric motor driving a threaded shaft, a tapped nut riding on said shaft and supporting the photoconductors.

6. A rangefinder comprising a projector furnishing a modulated light beam directed on the object whose distance is to be determined, a receiver adapted to pick up the rays of said modulated light beam reflected by the object, said rays being subject to disturbances arising from chance interference signals, said receiver comprising two photoconductors furnishing electrical signals in response to the reflected light rays, said two photoconductors being each connected to two resistances to form therewith a bridge, a differential amplifier having two input transistors, two condensers each connected to one of said two input transistors to apply thereto the output signal of said bridge, said rangefinder comprising a make-and-break device for cutting off and connecting the signal furnished by the receiver, said device being actuated in rhythm with the modulation of the light beam by having a constant phase relationship with respect to said modulation, said make-and-break device connecting the receiver to a storage device for the measured signals and for the interference signals as well, in which the stored sums of the interference signals give an appreciably nil value.

* * * * *